(12) United States Patent
Webb (10) Patent No.: US 10,225,190 B2
(45) Date of Patent: Mar. 5, 2019

(54) VIRTUALIZED PATH IDENTIFIER PROVIDING GENERIC DESCRIPTORS FOR REACHING A DESTINATION USING AN IDENTIFIED PATH DETERMINATION METHOD

(71) Applicant: Cisco Technology, Inc., San Jose, CA (US)

(72) Inventor: Mark Allen Webb, Troy, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 115 days.

(21) Appl. No.: 15/244,952

(22) Filed: Aug. 23, 2016

(65) Prior Publication Data
US 2018/0062994 A1    Mar. 1, 2018

(51) Int. Cl.
*H04W 28/06*    (2009.01)
*H04L 12/741*    (2013.01)
*H04W 4/021*    (2018.01)

(52) U.S. Cl.
CPC ........... *H04L 45/745* (2013.01); *H04W 4/021* (2013.01)

(58) Field of Classification Search
CPC ...... H04L 45/745; H04W 4/021; H04W 28/06
See application file for complete search history.

(56) References Cited

U.S. PATENT DOCUMENTS

| | | | |
|---|---|---|---|
| 7,948,986 B1 * | 5/2011 | Ghosh | H04L 45/50 370/392 |
| 8,315,636 B2 | 11/2012 | Moon et al. | |
| 8,380,700 B2 | 2/2013 | Moon et al. | |
| 8,527,457 B2 | 9/2013 | Moon et al. | |
| 8,612,279 B2 | 12/2013 | Moon et al. | |
| 8,762,964 B2 | 6/2014 | Turner et al. | |
| 2013/0170435 A1 * | 7/2013 | Dinan | H04L 45/50 370/328 |
| 2015/0103844 A1 * | 4/2015 | Zhao | H04L 45/42 370/410 |

(Continued)

OTHER PUBLICATIONS

Comer, "Packet Classification: A Faster, More Generic Alternative to Demultiplexing", The Internet Protocol Journal, vol. 15, No. 4, [online] Dec. 2012, [retrieved on Jul. 25, 2016]. Retrieved from the Internet: URL: <http://www.cisco.com/c/en/us/about/press/internet-protocol-journal/back-issues/table-contents-58/154-packet.html>, 6 pages.

(Continued)

*Primary Examiner* — Wei Zhao
(74) *Attorney, Agent, or Firm* — Leon R. Turkevich (57) ABSTRACT

In one embodiment, a method comprises: acquiring a data structure containing a virtualized path identifier, the virtualized path identifier specifying a path determination method and a destination identifier that identifies a destination that is reachable according to the path determination method; determining in a route method database based on the virtualized path identifier, from among distinct types of available path determination methods identified in the route method database, a routing context for reaching the destination according to the corresponding path determination method; and causing reaching of the destination in response to executing the path determination method on the destination identifier according to the routing context obtained from the route method database.

20 Claims, 5 Drawing Sheets

(56) References Cited

U.S. PATENT DOCUMENTS

2015/0109904 A1 4/2015 Filsfils et al.
2016/0335110 A1* 11/2016 Paithane ............. G06F 9/45558

OTHER PUBLICATIONS

Webb et al., "Route Policy Arbiter Method", An IP.com Prior Art Database Technical Disclosure, Cisco Systems, Inc., [online], May 26, 2016 [retrieved on Jul. 12, 2016]. Retrieved from the Internet: URL: <http://ip.com/IPCOM/000246306>, 11 pages.

Przygienda et al., "M-ISIS: Multi Topology (MT) Routing in Intermediate System to Intermediate Systems (IS-ISs)", Network Working Group, Request for Comments: 5120, Feb. 2008, pp. 1-14.

Farinacci et al., "The Locator/ID Separation Protocol (LISP)", Internet Engineering Task Force (IETF), Request for Comments: 6830, Jan. 2013, pp. 1-75.

Previdi, Ed, et al., "Source Packet Routing in Networking (SPRING) Problem Statement and Requirements", Internet Engineering Task Force (IETF), Request for Comments: 7855, May 2016, pp. 1-19.

Wikipedia, "Abstract Syntax Notation One", [online], Jun. 8, 2016, [retrieved on Jul. 25, 2016]. Retrieved from the Internet: URL: <https://en.wikipedia.org/w/index.php?title=Abstract_Syntax_Notation_One&printable=yes>, pp. 1-7.

Wikipedia, "Named data networking", [online], Feb. 12, 2016, [retrieved on Jul. 12, 2016]. Retrieved from the Internet: URL: <https://en.wikipedia.org/w/index.php?title=Named_data_networking&printable=yes>, pp. 1-9.

Wikipedia, "X.690", [online], Jul. 4, 2016, [retrieved on Jul. 25, 2016]. Retrieved from the Internet: URL: <https://en.wikipedia.org/w/index.php?title=X.690&printable=yes>, pp. 1-8.

"Information technology—Abstract Syntax Notation One (ASN.1): Specification of basic notation", International Telecommunication Union, ITU-T X.680, Series X: Data Networks and Open System Communications, OSI Networking and system aspects—Abstract Syntax Notation One (ASN.1), [online], Jul. 2002, [retrieved on Jul. 22, 2016]. Retrieved from the Internet: URL: <https://www.itu.int/ITU-T/studygroups/com17/languages/X.680-0207.pdf>, 146 pages.

* cited by examiner

VIRTUALIZED PATH IDENTIFIER PROVIDING GENERIC DESCRIPTORS FOR REACHING A DESTINATION USING AN IDENTIFIED PATH DETERMINATION METHOD

TECHNICAL FIELD

The present disclosure generally relates to a virtualized path identifier providing generic descriptors for reaching a destination using an identified path determination method.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Existing routing systems (such as those providing access to the Internet) typically are deployed based on pre-configuring network devices to follow a prescribed routing protocol, enabling the network devices to forward an object according to the specific routing protocol deployed within the routing system. For example, propagation of an IPv4 data packet inherently requires initiation (i.e., generation) of the IPv4 data packet within an IPv4 data network by an IPv4-configured network device, forwarding the IPv4 data packet by one or more IPv4-configured devices (e.g., IPv4 routers), and terminating propagation of the IPv4 data packet by an IPv4-configured destination device. Attempts to translate from a first routing protocol (e.g., IPv4/RIP) to a second different routing protocol (e.g., IPv6/OSPF) requires a network device to be pre-configured to not only recognize both protocols, but requires the network device to be pre-configured to translate from the first protocol to the second protocol (e.g., an IPv4/IPv6 gateway); alternately, the network device must be pre-configured to encapsulate the first-protocol data packet (e.g., an IPv4 data packet) within the second-protocol data packet (e.g., an IPv6 data packet) for transmission via the second routing system according to the second different routing protocol.

Hence, translation to different routing protocols is limited to a network device being pre-configured to the specific routing protocols in use.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: acquiring a data structure containing a virtualized path identifier, the virtualized path identifier specifying a path determination method and a destination identifier that identifies a destination that is reachable according to the path determination method; determining in a route method database based on the virtualized path identifier, from among distinct types of available path determination methods identified in the route method database, a routing context for reaching the destination according to the corresponding path determination method; and causing reaching of the destination in response to executing the path determination method on the destination identifier according to the routing context obtained from the route method database.

In another embodiment, an apparatus comprises a device interface circuit and a processor circuit. The device interface circuit is configured for acquiring a data structure containing a virtualized path identifier, the virtualized path identifier specifying a path determination method and a destination identifier that identifies a destination that is reachable according to the path determination method. The processor circuit is configured for determining in a route method database based on the virtualized path identifier, from among distinct types of available path determination methods identified in the route method database, a routing context for reaching the destination according to the corresponding path determination method, the processor circuit configured for causing reaching of the destination in response to executing the path determination method on the destination identifier according to the routing context obtained from the route method database.

In another embodiment, one or more non-transitory tangible media are encoded with logic for execution by a machine and when executed by the machine operable for: acquiring, by the machine, a data structure containing a virtualized path identifier, the virtualized path identifier specifying a path determination method and a destination identifier that identifies a destination that is reachable according to the path determination method; determining in a route method database based on the virtualized path identifier, from among distinct types of available path determination methods identified in the route method database, a routing context for reaching the destination according to the corresponding path determination method; and causing reaching of the destination in response to executing the path determination method on the destination identifier according to the routing context obtained from the route method database.

DETAILED DESCRIPTION

Particular embodiments enable routing of a data packet or a movable network device through different types of physical routing domains having respective path determination methods, based on providing for each path determination method a virtualized path identifier: the virtualized path identifier provides generic descriptors that enable determination of a routing context for reaching a destination according to the corresponding path determination method. Hence, the generic descriptors provide an "abstraction" of a specific path determination method, such that the virtualized path identifier (VPR) can provide a generic representation of the specific path determination method.

Consequently, a network device can utilize different path determination methods for traversal of the network device (or a data packet forwarded by the network device) across different physical routing domain types deploying respective path determination methods. Hence, the example embodiments enable the deployment of flexible, adaptable methodologies, as a network device is no longer limited to a pre-configured path determination method such as GPS, Internet Protocol (IPv4 or IPv6), etc. To the contrary, a network device can use the virtualized path identifier as an "index" to access a route method determination database (stored locally or remotely reachable) to determine a routing context for the corresponding path determination method identified in the VPR.

Figure 1A:
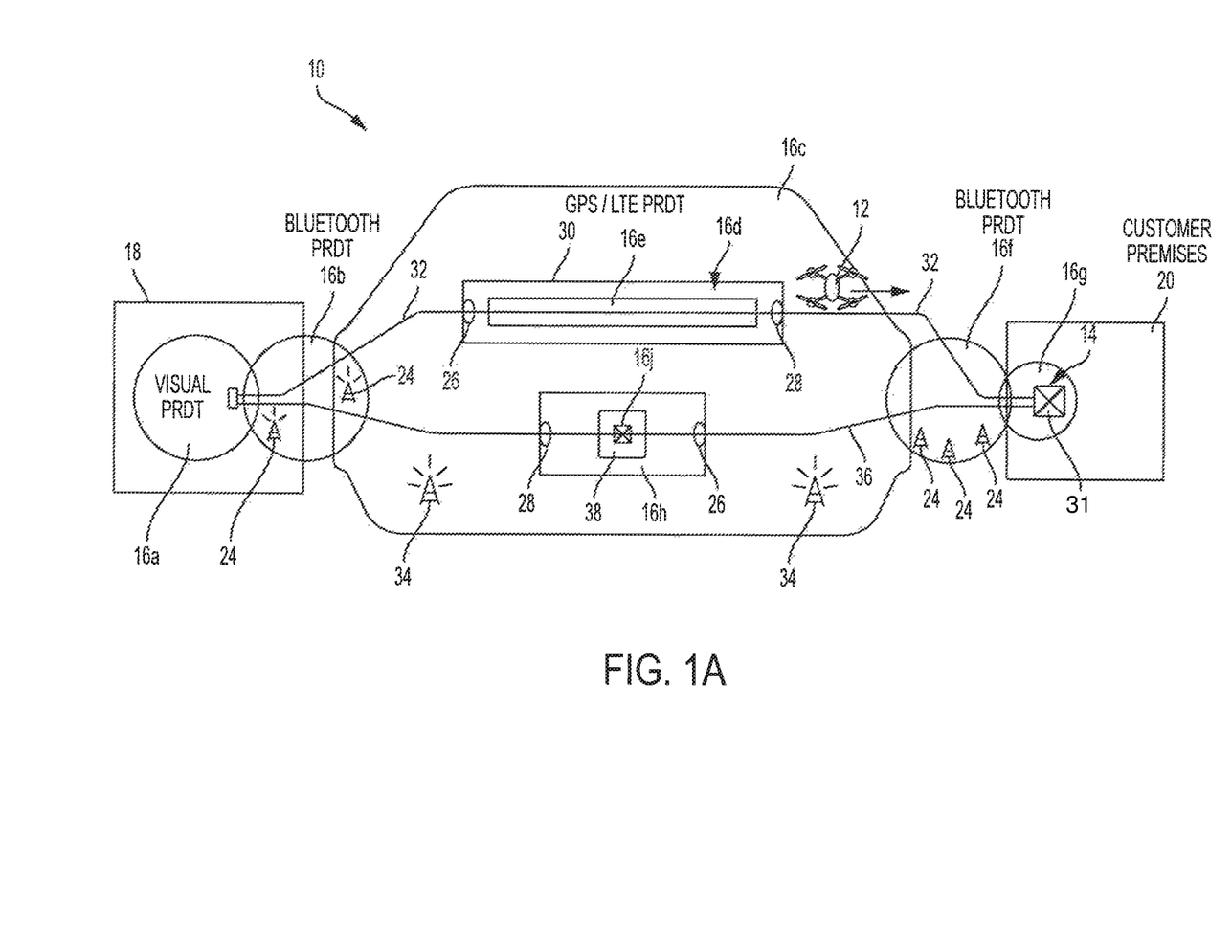
FIGS. 1A and 1B illustrate example systems having an apparatus interpreting a virtualized path identifier providing generic descriptors for reaching a destination using an identified path determination method, according to an example embodiment.
Figure 1B:
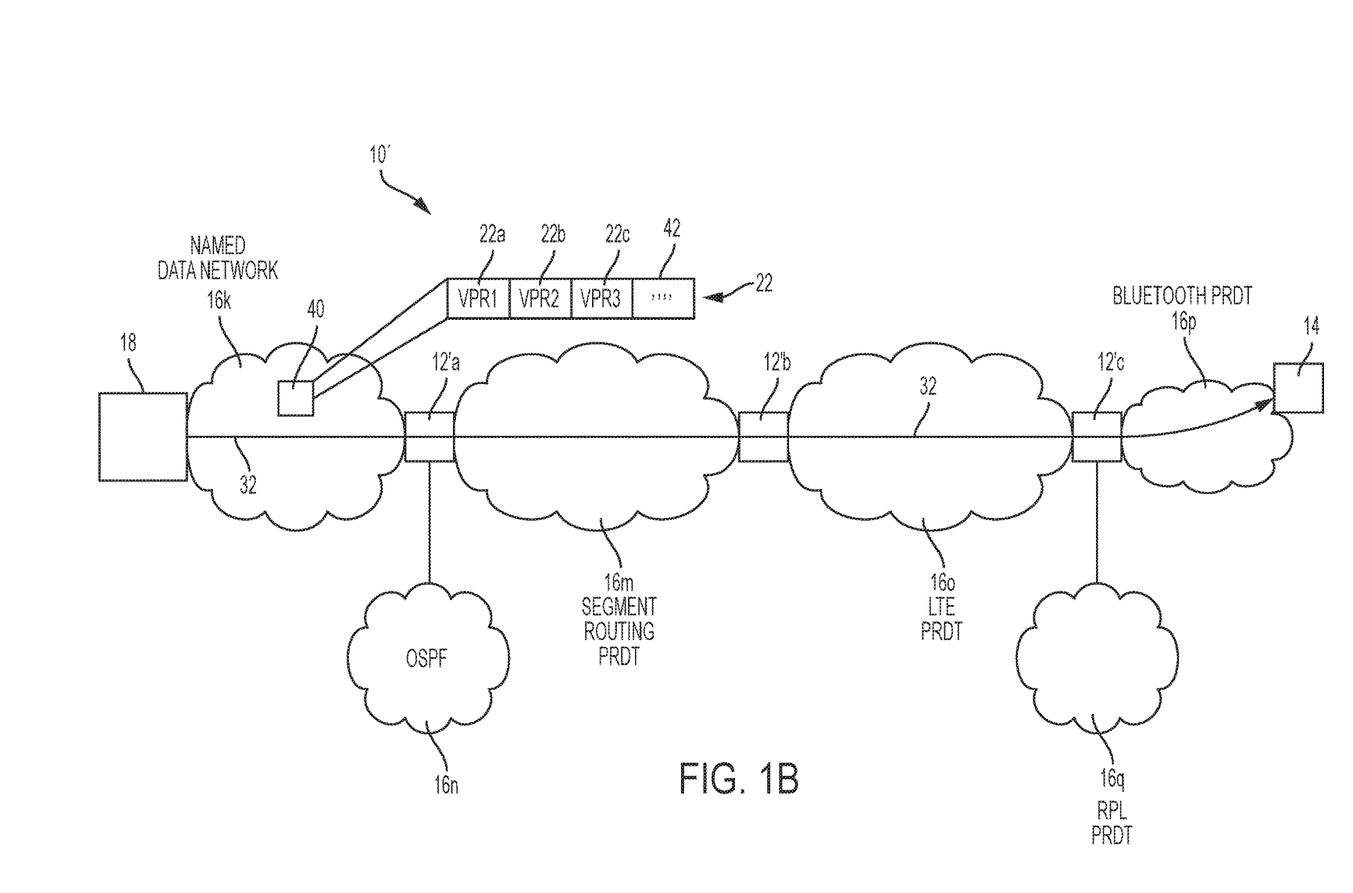

FIGS. 1A and 1B are diagrams illustrating example heterogeneous data networks 10 and 10' having a VPR-enabled routing apparatus 12 for reaching toward a final destination 14 via multiple types of physical routing domains 16, according to an example embodiment. The VPR-enabled routing device 12 is a physical machine (i.e., a hardware device) configured for implementing network communications with other physical machines via the data network 10 or 10'. The term "configured for" or "configured to" as used herein with respect to a specified operation refers to a device and/or machine that is physically constructed and arranged to perform the specified operation. Hence, the VPR-enabled routing device 12 is a network-enabled machine implementing network communications via the network 10 or 10'.

The VPR-enabled routing device 12 illustrated in FIG. 1A can be implemented as a mobile network device such as a quadcopter "drone" device that can be configured for delivering a physical package from a source location premises (e.g., an order fulfillment center) 18 to a destination location premises (e.g., a customer premises) 20; the VPR-enabled routing device 12 also can be implemented as a mobile network device such as an autonomous vehicle (e.g., a self-driven vehicle), etc. Hence, the reachability to the destination location 20 can refer to controlled navigation by the quadcopter "drone" device 12 (or other autonomous vehicle) in FIG. 1A from the source location 18 to the destination location 20 across multiple physical routing domain types 16 utilizing respective distinct path determination methods.

As described in further detail below, the sequential execution of virtualized path identifiers 22 enables the quadcopter "drone" device 12 in FIG. 1A to traverse a sequence of different physical routing domain types 16 having respective path determination methods, including for example: traversing a visual physical routing domain type (PRDT) 16a comprising "QR" codes (or other machine-readable visual indicia) for precise positional control of the quadcopter "drone" device 12 within confined interior spaces of the order fulfillment center 18 using a corresponding visual path determination method; traversing a Bluetooth PRDT 16b comprising one or more Bluetooth "beacons" 24 as navigation beacons for the quadcopter "drone" device 12 along exterior driveways or "lanes" exiting the order fulfillment center 18 using a corresponding Bluetooth path determination method; traversing a geospatial-based (e.g., GPS based or Long Term Evolution (LTE)-based) PRDT 16c enabling navigation based on GPS coordinates (or LTE zone identifiers) in a large, open space region using a corresponding geospatial path determination method; traversing a "geofence" PRDT 16d having a defined entry point 26, a defined egress point 28, and a defined geofence boundary 30 (e.g., along a "virtual" highway due to regulatory constraints) using a geofence path determination method, including executing a locally-optimized spatial PRDT (e.g., a collision avoidance method or traffic optimization method) 16e for optimized movement and reachability while within the defined geofence boundary 30 using a corresponding spatial path determination method; traversing a second Bluetooth PRDT 16f within a neighborhood of the destination location 20 using a Bluetooth path determination method; and traversing a visual PRDT 16g providing a visual QR code (or other machine-readable visual indicia) 31 to guide the quadcopter "drone" device 12 to reach a precise delivery location as the final destination 14 at the customer premises 20, for example a front door of a residential house, or a delivery entrance of a business, using a visual path determination method.

Hence, the sequential execution of the sequence of virtualized path identifiers 22 from the source location 18 to the destination location 20 enables the quadcopter "drone" device 12 to reach the final destination 14 via a delivery path 32 that can be either programmed into the quadcopter "drone" device 12 prior to initiating delivery from the order fulfillment center 18 or dynamically updated based on transmission of the virtualized path identifiers 22 via beacons 24, 34, along the delivery path 32. The sequential execution of virtualized path identifiers 22 also enables the quadcopter "drone" device 12 in FIG. 1A to return to the order fulfillment center 18 via a return path 36 (either programmed in the quadcopter "drone" device 12 prior to initiating delivery or dynamically updated by the beacons 24, 34 along the return path 36), including for example a detour to a battery recharging station 38 using a visual PRDT 16j providing a "QR" code identifying an available recharging module in the battery recharging station 38, residing within a geofence PRDT 16h. As apparent from the foregoing, the quadcopter "drone" device 12 can receive the virtualized path identifiers 22 defining the delivery path 32 or return path 36 dynamically from any network device (e.g., a network device at the source location 18, or along the path 32 and/or 34 via the Bluetooth beacon 24, and/or the beacon device 34).

FIG. 1B illustrates another example data network 10' (e.g., a "next-generation Internet") comprising the VPR-enabled routing device 12' implemented as a fixed and/or mobile network-based routing device that can be configured for forwarding a received data packet 40 along a delivery path 32 comprising multiple physical routing domain types 16, according to an example embodiment. In one example, the data packet 40 can comprise a routing header (e.g., a source routing header) 42 specifying the sequence of virtualized path identifiers 22 to be used for reaching the next-hop destination. In this example of FIG. 1B, each VPR-enabled routing device 12 can be configured for determining, from the next successive (i.e., contiguously-following) virtualized path identifier 22 in the sequence stored in the routing header 42, the path determination method for reaching the next-hop destination via the corresponding physical routing domain type 16. For example, the network device 12'a can determine, from the virtualized path identifier 22a received via the named data network PRDT 16k, that the next path determination method to be executed is segment routing for the segment routing PRDT 16m (as opposed to the available OSPF 16n), and in response execute segment routing (based on obtaining the corresponding routing context based on the virtualized path identifier 22a) and cause the data packet 40 to reach the next-hop destination 12'b of the segment route; the VPR-enabled routing device 12'b can respond to receiving the data packet 40 by acquiring the virtualized path identifier 22b from the routing header 42, determine from the virtualized path identifier 22b that the next path determination method is for the LTE PRDT 16o, and in response execute LTE-based routing to cause the data packet 40 to reach the next-hop destination 12'c; the VPR-enabled routing device 12'c can respond to receiving the data packet 40 by acquiring the virtualized path identifier 22c from the routing header 42, determine from the virtualized path identifier 22c that the next path determination method is for the Bluetooth PRDT 16p (as opposed to a RPL PRDT 16q for a Routing Protocol for Low Power and Lossy Networks (RPL)), and in response execute Bluetooth-based routing to cause the data packet 40 to reach the final destination 14.

Hence, the sequence of virtualized path identifiers 22 enable one or more VPR-enabled routing devices 12 to cause reachability to the final destination 14 using one or more available path determination methods across multiple physical routing domain types 16, either in the form of the VPR-enabled routing device 12 (implemented as a quadcopter "drone" device) reaching the final destination 14, or in the form of one or more VPR-enabled routing devices 12 forwarding a data packet 40 along a delivery path 32 defined by the sequence of virtualized path identifiers 22. As described below, each virtualized path identifier 22 can specify the path determination method and a destination identifier that identifies a destination that is reachable via the path determination method; hence, a VPR-enabled routing device 12 can determine a routing context for reaching the destination according to the corresponding path determination method, based on accessing the routing context from a route method database configured for storing routing contexts for respective available path determination methods. The VPR-enabled routing device 12 can execute the path determination methods, according to the routing context obtained from the route method database, to cause reachability (by a mobile device or a received data packet) to the identified destination.

Hence, a VPR-enabled routing device 12 can be dynamically programmed with any path determination method, providing a "future-proof" system that can automatically deploy a newly-developed path determination method, based on accessing a route method database providing the corresponding routing context for the newly-developed path determination method.

Figure 2:
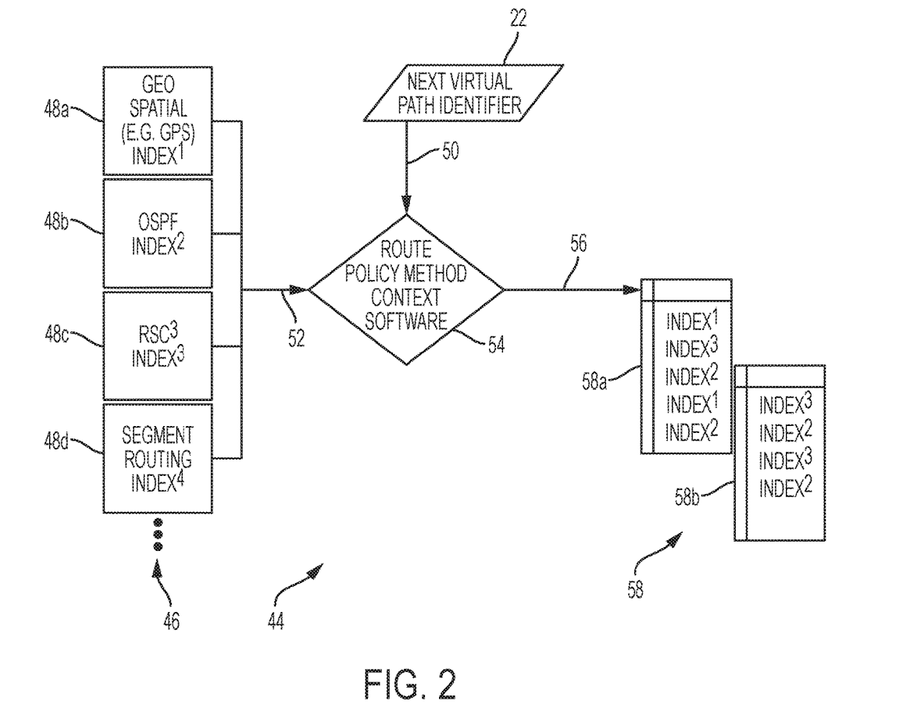
FIG. 2 illustrate an example determination of a routing context for reaching a destination according to a corresponding path determination method described by a virtualized path identifier, according to an example embodiment.

FIG. 2 illustrates an example system 44 executed by a VPR-enabled routing device 12 in executing a routing operation to reach a final destination 14 in response to receiving a virtualized path identifier 22, according to an example embodiment. The system 44 can be implemented by any VPR-enabled routing device 12 in hardware, described in further detail below with respect to FIG. 4.

The system 44 executed by a VPR-enabled routing device 12 includes a route method database 46 comprising routing context information 48 for distinct types of available path determination methods, including for example geospatial-based routing context information 48a, OSPF-based routing context information 48b, other route source (RSC)-based routing context information 48 (e.g., for Bluetooth or Bluetooth Low Energy, video or image-based, ground station-based beacon based, video learning-based, 3G/4G/LTE based, Wi-Fi based, free space optical based, etc.), segment routing-based routing context information 48d, etc. The routing context information 48 for each path determination method contains all routing-based information (including semantics, rules, protocols, etc.) necessary to enable the VPR-enabled routing device 12 to reach at least a next-hop destination specified in the virtualized path identifier 22 via the corresponding physical routing domain type 16 according to the corresponding path determination method.

Hence, in response to the VPR-enabled routing device 12 acquiring in operation 50 the next available virtualized path identifier 22 (e.g., from the virtualized path identifier 22 of a received routing header 42, or in response to acquiring a message containing the virtualized path identifier 22 and transmitted by a beacon device 34), the VPR-enabled routing device 12 can identify the path determination method specified in the virtualized path identifier 22, and in response determine in operation 52 the corresponding routing context information 48 from the route method database 46 for example based on using the path determination method specified in the virtualized path identifier 22 as an index into the route method database 46.

The VPR-enabled routing device 12 in operation 54 can execute an executable resource (e.g., a "route policy method context software") to determine from the virtualized path identifier 22 and the retrieved routing context information 48 the appropriate route(s), policy (or policies), methods, as appropriate, for reaching the next-hop destination specified in the virtualized path identifier 22. If necessary, the VPR-enabled routing device 12 in operation 56 can generate a route method table 58 specifying primary/alternate paths, policies, etc., to be used for a corresponding path determination method; the route method table 58 also can include instructions for mapping to a different physical routing domain type 16, for example a nested optimization executed within an existing routing context, described below, or "jumping" to a different routing context. Hence, the VPR-enabled routing device 12 can execute a first route method table 58a for use during execution of the routing context information 48a, a second route method table 58b for use during execution of the routing context information 48b, etc. (the route method table 58 also can implemented as a cached optimization of the execution in operation 54).

Figure 3:
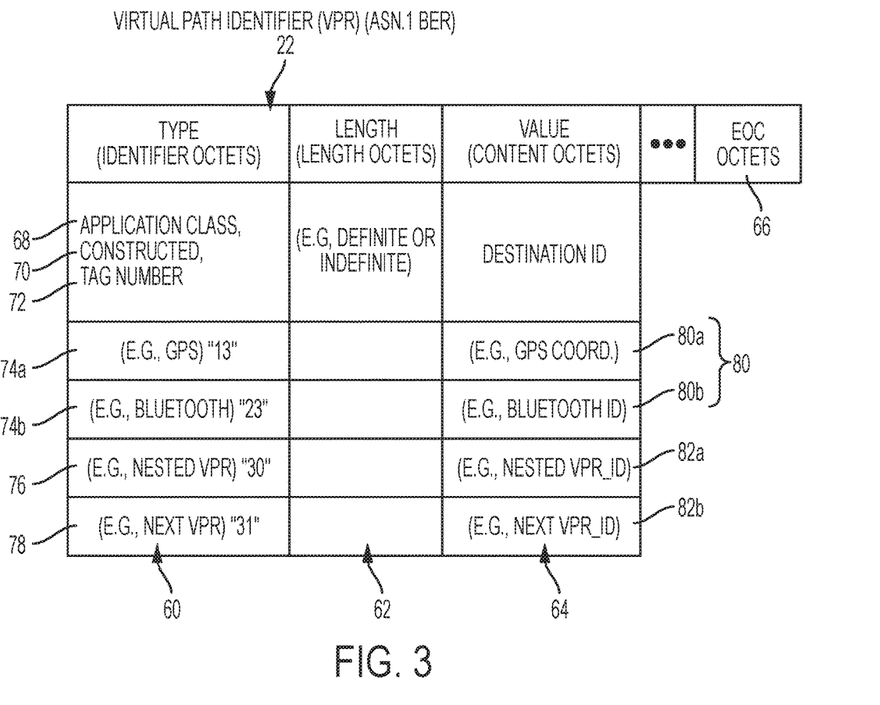
FIG. 3 illustrates an example virtualized path identifier, according to an example embodiment.

FIG. 3 illustrates an example virtualized path identifier 22, according to an example embodiment. The virtualized path identifier 22 can specify metadata formatted according to a generic Type Length Value (TLV) format notation according to an Abstract Syntax Notation (ASN.1) Basic Encoding Rules (BER) constructed TLV format. In particular, ASN.1 is a defined standard and a prescribed notation that describes rules and structures for representing, encoding, transmitting, and decoding data in telecommunications and computer networking. Basic Encoding Rules (BER) specifies a self-describing and self-delimiting format for encoding ASN.1 data structures such as the virtualized path identifier 22. Each virtualized path identifier 22 as encoded includes a type identifier 60, a length description 62, a content object 64, and, where necessary, an end-of-content (EOC) marker 66. The fields 60, 62, and 64 are referred to as type-length-value or TLV encodings. The TLV encoding format enables the VPR-enabled routing device 12 to decode the ASN.1 information in the fields 60, 62, and 64 (e.g., even if a data packet stream is incomplete) without requiring any pre-knowledge of the size, content, or semantic meaning of the data specified in the content object 64.

The type identifier 60 includes information, encoded according to the BER, that identifies a path determination method using a tag class structure; for example, the type identifier 60 can include tag information that indicates the initial octet of the type identifier 60 includes a tag class identifier (e.g., a prescribed class "Application" that is valid for only a particular application), and a "Constructed" flag indicating the "type" is a "Constructed" encoding type (as opposed to a "Primitive" encoding type) and that the content object 64 contains zero, one, or more element encodings. Hence, the type identifier 60 can identify the encoding type as an "Application" class 68 having a "Constructed" encoding type 70; the type identifier 60 also includes a tag number 72 that can be used to identify a path determination method and distinguish from other path determination methods. For example, the tag number "13" can be used to identify a GPS-based (geospatial) path determination method 74a; the tag number "23" can be used to identify a Bluetooth-based path determination method 74b, etc. Hence, a VPR-enabled routing device 12 can identify the path determination method 74 based on the corresponding tag number 72 specified in the type identifier 60 of the virtualized path identifier 22. As apparent from the foregoing, a tag number 72 can be used to identify the corresponding path determination method 74 for any of the respective physical routing domain types 16 of FIGS. 1A and/or 1B.

A VPR-enabled routing device 12 also can detect additional octets in the type identifier 60, following the identifiers for the "Application" class 68, the "Constructed" encoding type 70, and the tag number 72, including for example instructions 76 for nested optimization (e.g., a tag number "30" identifying in the content object 64 an embedded virtualized path identifier 22 for nested optimization), or instructions 78 for switching to a successive path determination method specified by a successive virtualized path identifier 22 in a sequence of virtualized path identifiers 22 (e.g., as illustrated in the routing header 42 of FIG. 1B) (e.g., using the tag number "31" to specify the successive virtualized path identifier 22 is identified in the content object 64).

The length descriptor 62 can specify a "definite" form, which encodes the number of content octets in the content object 64; the "definite" form is used for a "Constructed" encoding type 70 if the data is immediately available in the content object 64. The length descriptor 62 alternatively can specify an "indefinite" form that does not encode the length, but indicates that the content octets 64 end at marker octets (e.g., at the EOC marker 66); the "indefinite" form can be used if the content is not immediately available at encoding time.

The content object 64 can identify a next-hop destination 80 to be reached according to the corresponding path determination method 74 (e.g., GPS coordinates 80a for the geospatial path determination method 74a, a Bluetooth identifier 80b for the Bluetooth path determination method 74b, etc.), or an identifier ("VPR_ID") 82 for a virtualized path identifier 22 to be executed during (or following) execution of the current virtualized path identifier 22.

Hence, the virtualized path identifier 22 contains all metadata necessary to enable the VPR-enabled routing device 12 to obtain the routing context information 48, from the route method database 46, in order to execute the appropriate routing operation according to the identified path determination method 74.

Figure 4:
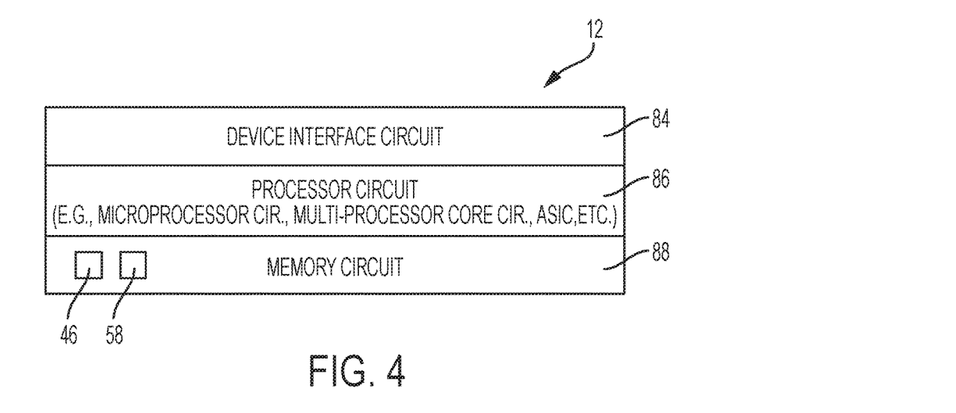
FIG. 4 illustrates an example apparatus of FIGS. 1A and/or 1B, according to an example embodiment.

FIG. 4 illustrates an example implementation of any one of the VPR-enabled routing devices 12 of FIGS. 1A and/or 1B, according to an example embodiment. Each apparatus 12 can include a device interface circuit 84, a processor circuit 86, and a memory circuit 88. In the example of the VPR-enabled routing device 12 implemented as a quadcopter "drone" device as in FIG. 1A, the VPR-enabled routing device 12 also can include additional components not shown in FIG. 4, for example associated actuators (e.g., quadcopter motors), sensor devices (e.g., camera, microphone or other sonic transducer, free space optical receiver, etc.).

The device interface circuit 84 can include one or more distinct physical layer transceivers for communication with any other devices 12 or beacon 24 or 34; the device interface circuit 84 also can include multiple physical layer transceivers for communications according to the available physical routing domain types 16, for example an IEEE based Ethernet transceiver for communications with the devices of FIGS. 1A and/or 1B via any type of data link (e.g., a wired or wireless link, an optical link, etc.). The processor circuit 86 can be configured for executing any of the operations described herein including the operations of FIG. 2, and the memory circuit 88 can be configured for storing any data structures or data packets as described herein, such as one or more virtualized path identifiers 22 in a routing header 42 of a received data packet, the route method database 46, and/or the route method tables 58.

Any of the disclosed circuits of the VPR-enabled routing devices 12 (including the device interface circuit 84, the processor circuit 86, the memory circuit 88, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 88) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 88 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/ packet on the communications medium, and storing the detected transmission as a data structure in a non-transitory tangible memory medium in the disclosed apparatus (e.g., in a receive buffer). Also note that the memory circuit 88 can be implemented dynamically by the processor circuit 86, for example based on memory address assignment and partitioning executed by the processor circuit 86.

Figure 5:
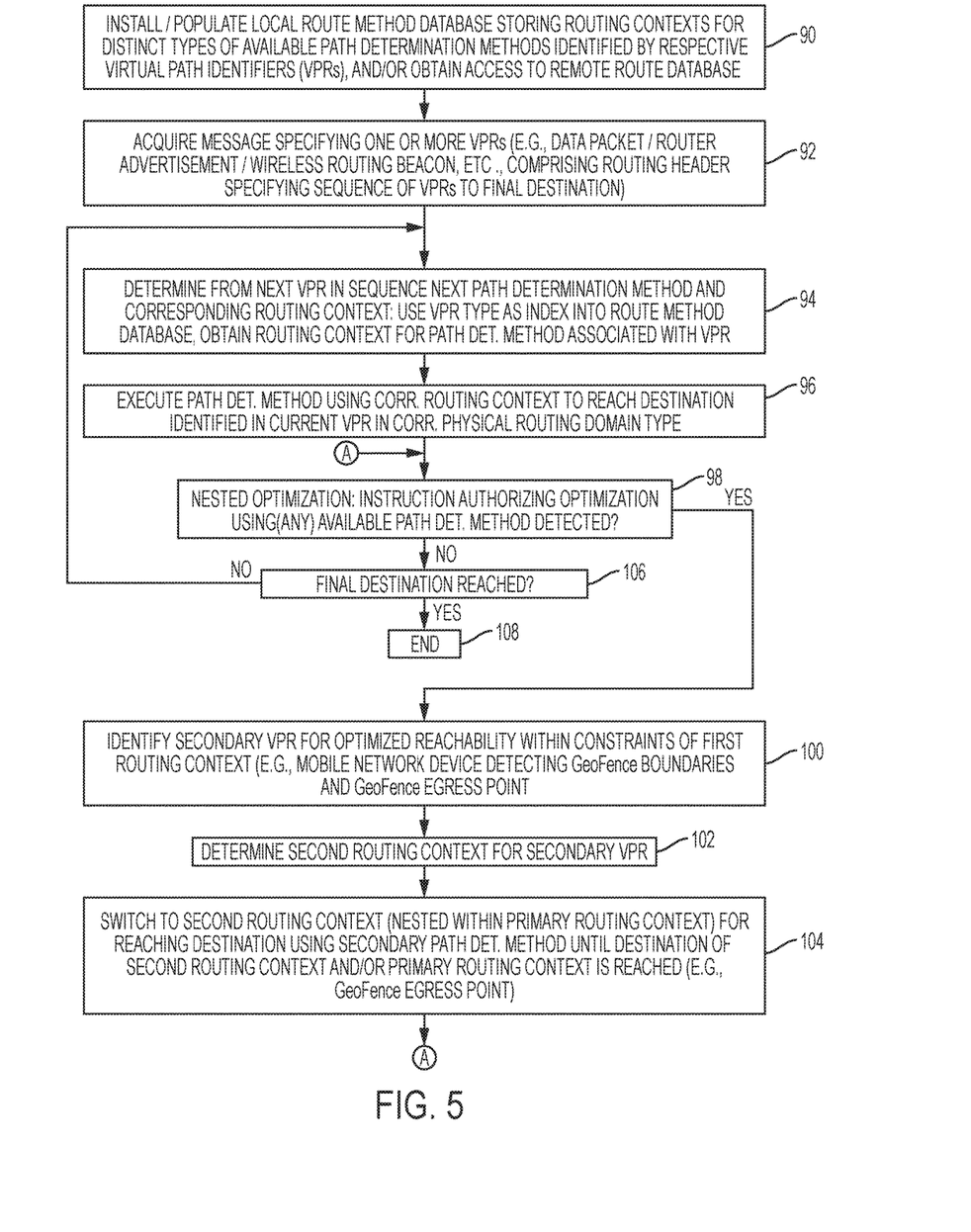
FIG. 5 illustrates an example method by the apparatus of FIGS. 1A and/or 1B, according to an example embodiment.

FIG. 5 illustrates an example method by the apparatus of FIGS. 1A and/or 1B of generating a routing decision, according to the routing context for a corresponding path determination method, for causing reachability to a destination according to the corresponding path determination method, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to operation 90 in FIG. 5, the processor circuit 86 in a VPR-enabled routing device 12 is configured for installing and/or populating a local route method database 46 in the memory circuit 88 (and/or a locally-available memory structure such a flash memory device), for example based on receiving configuration information (including the corresponding routing context information 48) from a network administrator (not shown) or a developer of a particular path determination method 74. Alternately, the processor circuit 86 can store an identifier (e.g., a universal resource identifier (URI)) that identifies a location for obtaining the routing context information 48 for a corresponding identified virtualized path identifier 22, enabling the processor circuit 86 of the VPR-enabled routing device 12 to execute the relevant routing operation for a received virtualized path identifier 22 upon obtaining the corresponding routing context information 48 (either locally in the memory circuit 88 or remotely via a URI).

The device interface circuit 84 of the VPR-enabled routing device 12 in operation 92 is configured for acquiring in operation 92 a data structure specifying one or more virtualized path identifiers 22, for example in the form of a delivery instruction received by the quadcopter "drone" device 12 of FIG. 1A and specifying one or more virtualized path identifiers 22, enabling the quadcopter "drone" device 12 to route itself along the delivery path 32 to the final destination 14; in this example, the delivery instruction can be transmitted by the order fulfillment center 18 to the quadcopter "drone" device 12 while the quadcopter "drone" device 12 is positioned at its "home base" prior to starting delivery; one or more virtualized path identifiers 22 also can be transmitted by one or more beacon devices 24 and/or 34, for example to add incomplete routing information and/or to reroute the quadcopter "drone" device 12. The one or more virtualized path identifiers 22 also can be received in the form of a data packet 40 comprising a routing header 42 carrying one or more virtualized path identifiers 22.

In response to receiving the next virtualized path identifier 22 for processing, the processor circuit 86 in operation 94 can determine the next path determination method 74 identified by the corresponding tag number 72 in the type identifier 60 of the virtualized path identifier 22, illustrated in FIG. 3. In response to determining the path determination method 74 specified in the type identifier 60, the processor circuit 86 can use the tag number 72 as an index into the route method database 46 to obtain the corresponding routing context information 48; if necessary, the processor circuit 86 can access the routing context information 48 from a remote location (e.g., via a URI), in the event the corresponding routing context information 48 is not locally available.

The processor circuit 86 of the VPR-enabled routing device 12 in operation 96 executes the path determination method 74 identified in the type identifier 60 of the virtualized path identifier 22, using the corresponding routing context information 48, to determine a routing decision to reach the next-hop destination 80 specified in the content object 64. For example, the processor circuit 86 can execute a routing decision based on any available route method table 58s, as appropriate; alternately, the processor circuit 86 can construct the routing decision based on applying the semantics (obtained from the routing context information 48) to the metadata parameters specified in the virtualized path identifier 22. The processor circuit 86 executes the determined routing decision to cause reaching of the next-hop destination 80, for example sending a control message to an actuator for controlled navigation to the next-hop destination 80 (in the case of a quadcopter "drone" device 12 in FIG. 1A) based on, for example, navigation signals received by the device interface circuit 84 and/or local sensor devices from transmitters in the associated physical routing domain type 16; alternately, in the case of a network device 12' of FIG. 1B, the processor circuit 86 can cause the device interface circuit 84 to forward the received data packet 40 according to the next physical routing domain type 16, for example based on encapsulating (or repackaging) the received data packet 40 in a new data packet for the associated physical routing domain type 16.

Instances may arise where nested optimization may be executed, for example in the case of the quadcopter "drone" device 12 of FIG. 1A entering the geofence physical routing domain type 16d at the defined entry point 26: in this case, the processor circuit 86 may detect in operation 98, within the virtualized path identifier 22 for the geofence physical routing domain type 16d, a nested optimization instruction 76 for executing another virtualized path identifier 22 (optionally identified by the identifier 82a) for optimization using the locally-optimized spatial PRDT (e.g., a collision avoidance method or traffic optimization method) physical routing domain type 16e within the routing context of the geofence physical routing domain type 16d. The virtualized path identifier 22 for the geofence physical routing domain type 16d also may specify that any optimization may be used within the defined geofence boundary 30 enforced by the corresponding routing context. Hence, the processor circuit 86 in operation 100 can identify a secondary virtualized path identifier 22 (e.g., the collision avoidance/traffic optimization PRDT 16e), and determine in operation 102 the corresponding routing context information 48 in order to switch to the locally-optimized spatial PRDT 16e in operation 104, for optimized reachability within the constraints of the first routing context (e.g., within the geofence physical routing domain type 16d defining the defined geofence boundary 30). The second routing context can be maintained until reaching either the next-hop destination of the second routing context, the next-hop destination 80 of the primary routing context, or the final destination 14, as appropriate.

Assuming no other nested optimization after operation in 104 is to be executed in operation 98, the processor circuit 86 in operation 106 can determine if the final destination 14 has been reached; if the final destination 14 has not been reached, the processor circuit 86 can access the next successive virtualized path identifier 22 to determine the next path determination method 74 to be used in the next physical routing domain type 16, for example based on the next VPR instruction 78 specifying the next VPR identifier 82b (in FIG. 3), until the VPR-enabled routing device 12 can halt in operation 108 after reaching the final destination 14 in operation 106.

According to example embodiments, virtualized path identifiers can be used to provide generic descriptors for reaching a destination using identified path determination methods for different types of physical routing domains. Hence, the example embodiments enable a generic representation of different path determination methods and their respective routing contexts within their respective types of physical routing domains, enabling "future-proof" deployment of path determination methods in heterogeneous routing domains across multiple physical routing domain types.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    acquiring, by a network device, a data structure containing a virtualized path identifier, the virtualized path identifier specifying a path determination method and a destination identifier that identifies a destination that is reachable according to the path determination method;
    determining a routing context, by the network device, in a route method database based on the virtualized path identifier, the routing context determined from among distinct types of available path determination methods identified in the route method database for different physical routing domain types having respective different distinct physical network deployments in a heterogeneous data network, the routing context for reaching the destination across the corresponding physical routing domain type according to the corresponding path determination method; and
    causing reaching of the destination, via the corresponding physical routing domain type in the heterogeneous data network, in response to the network device executing the path determination method on the destination identifier according to the routing context obtained from the route method database.

2. The method of claim 1, wherein the virtualized path identifier specifies the path determination method based on metadata according to a generic Type Length Value (TLV) format notation, the determining including interpreting the metadata based on accessing the route method database using the metadata.

3. The method of claim 1, wherein the causing includes switching to using a second routing context comprising:
    detecting, within the routing context for the path determination method on the destination identifier, an instruction authorizing optimization for reaching the destination according to any available path determination method distinct and independent from the path determination method specified by the virtualized path identifier;
    identifying a second virtualized path identifier for optimized reachability to the destination within constraints of the routing context; and
    causing reaching of the destination using the second routing context of a second path determination method for optimized reachability to the destination, within the constraints of the routing context.

4. The method of claim 3, wherein:
    the causing reaching is executed by a mobile network device configured for moving toward the destination according to the routing context of the path determination method;
    the path determination method providing a geofence method for traveling within a prescribed geofence boundary and providing instructions for reaching the destination as an egress point for the geofence boundary;
    the second path determination method providing at least one of a traffic optimization method or collision avoidance method for optimized reachability, by the mobile network device, to the egress point while within the geofence boundary.

5. The method of claim 1, wherein:
    the acquiring includes detecting the virtualized path identifier within a sequence of virtualized path identifiers specifying respective distinct types of available path determination methods, the sequence for reaching a final destination via the respective distinct types of available path determination methods;
    the method further comprising switching from the routing context to a second routing context in response to detecting a second virtualized path identifier contiguously following the virtualized path identifier in the sequence;
    the switching from the routing context to the second routing context enabling reachability to the final destination across multiple physical routing domain types using the respective virtualized path identifiers.

6. The method of claim 5, further comprising a network device receiving a data packet comprising a routing header specifying the sequence of virtualized path identifiers, wherein the determining and causing reaching are executed by the network device in response to detecting the virtualized path identifier as a next-hop destination for the data packet.

7. The method of claim 5, wherein the acquiring includes a mobile network device receiving the data structure via a wireless transmission, the switching enabling the mobile network device to reach the final destination across the multiple physical routing domain types using the respective virtualized path identifiers.

8. An apparatus comprising:
    a device interface circuit configured for acquiring a data structure containing a virtualized path identifier, the virtualized path identifier specifying a path determination method and a destination identifier that identifies a destination that is reachable according to the path determination method; and a processor circuit configured for determining a routing context in a route method database based on the virtualized path identifier, the routing context determined from among distinct types of available path determination methods identified in the route method database for different physical routing domain types having respective different distinct physical network deployments in a heterogeneous data network, the routing context for reaching the destination across the corresponding physical routing domain type according to the corresponding path determination method, the processor circuit configured for causing reaching of the destination, via the corresponding physical routing domain type in the heterogeneous data network, in response to the processor circuit executing the path determination method on the destination identifier according to the routing context obtained from the route method database.

9. The apparatus of claim 8, wherein the virtualized path identifier specifies the path determination method based on metadata according to a generic Type Length Value (TLV) format notation, the processor circuit configured for interpreting the metadata based on accessing the route method database using the metadata.

10. The apparatus of claim 8, wherein the processor circuit is configured for includes switching to using a second routing context based on:
  detecting, within the routing context for the path determination method on the destination identifier, an instruction authorizing optimization for reaching the destination according to any available path determination method distinct and independent from the path determination method specified by the virtualized path identifier;
  identifying a second virtualized path identifier for optimized reachability to the destination within constraints of the routing context; and
  causing reaching of the destination using the second routing context of a second path determination method for optimized reachability to the destination, within the constraints of the routing context.

11. The apparatus of claim 10, wherein:
  the apparatus is a mobile network device configured for moving toward the destination according to the routing context of the path determination method;
  the path determination method providing a geofence method for traveling within a prescribed geofence boundary and providing instructions for reaching the destination as an egress point for the geofence boundary;
  the second path determination method providing at least one of a traffic optimization method or collision avoidance method for optimized reachability, by the mobile network device, to the egress point while within the geofence boundary.

12. The apparatus of claim 8, wherein:
  the processor circuit is configured for detecting the virtualized path identifier within a sequence of virtualized path identifiers specifying respective distinct types of available path determination methods, the sequence for reaching a final destination via the respective distinct types of available path determination methods;
  the processor circuit further configured for switching from the routing context to a second routing context in response to detecting a second virtualized path identifier contiguously following the virtualized path identifier in the sequence;
  the switching by the processor circuit from the routing context to the second routing context enabling reachability to the final destination across multiple physical routing domain types using the respective virtualized path identifiers.

13. The apparatus of claim 12, wherein:
  the device interface circuit is configured for receiving a data packet comprising a routing header specifying the sequence of virtualized path identifiers;
  the processor circuit configured for determining the routing context, and causing the reaching of the destination for the data packet, in response to detecting the virtualized path identifier as a next-hop destination for the data packet.

14. The apparatus of claim 12, wherein:
  the apparatus is implemented as a mobile network device;
  the device interface circuit is configured for receiving the data structure via a wireless transmission;
  the switching by the processor circuit enabling the mobile network device to reach the final destination across the multiple physical routing domain types using the respective virtualized path identifiers.

15. One or more non-transitory tangible media encoded with logic for execution by a machine and when executed by the machine operable for:
  acquiring, by the machine, a data structure containing a virtualized path identifier, the virtualized path identifier specifying a path determination method and a destination identifier that identifies a destination that is reachable according to the path determination method;
  determining a routing context, by the machine, in a route method database based on the virtualized path identifier, the routing context determined from among distinct types of available path determination methods identified in the route method database for different physical routing domain types having respective different distinct physical network deployments in a heterogeneous data network, the routing context for reaching the destination across the corresponding physical routing domain type according to the corresponding path determination method; and
  causing reaching of the destination, via the corresponding physical routing domain type in the heterogeneous data network, in response to executing the path determination method on the destination identifier according to the routing context obtained from the route method database.

16. The one or more non-transitory tangible media of claim 15, wherein the causing includes switching to using a second routing context comprising:
  detecting, within the routing context for the path determination method on the destination identifier, an instruction authorizing optimization for reaching the destination according to any available path determination method distinct and independent from the path determination method specified by the virtualized path identifier;
  identifying a second virtualized path identifier for optimized reachability to the destination within constraints of the routing context; and
  causing reaching of the destination using the second routing context of a second path determination method for optimized reachability to the destination, within the constraints of the routing context.

17. The one or more non-transitory tangible media of claim 15, wherein:

the acquiring includes detecting the virtualized path identifier within a sequence of virtualized path identifiers specifying respective distinct types of available path determination methods, the sequence for reaching a final destination via the respective distinct types of available path determination methods;

the one or more non-transitory tangible media further operable for switching from the routing context to a second routing context in response to detecting a second virtualized path identifier contiguously following the virtualized path identifier in the sequence;

the switching from the routing context to the second routing context enabling reachability to the final destination across multiple physical routing domain types using the respective virtualized path identifiers.

18. The method of claim 1, wherein:

the different distinct physical network deployments include two or more of a geofence-based physical network deployment, a geospatial-based physical network deployment, a collision avoidance-based physical network deployment, a mobile device traffic optimization-based physical network deployment, a machine-readable visual-based physical network deployment, an Open Shortest Path First (OSPF)-based physical network deployment, a route source (RSC)-based physical network deployment, a segment routing-based physical network deployment, or a Routing Protocol for Low Power and Lossy Networks (RPL)-based physical network deployment;

the causing including switching from a first to a second of the different distinct physical network deployments.

19. The apparatus of claim 8, wherein:

the different distinct physical network deployments include two or more of a geofence-based physical network deployment, a geospatial-based physical network deployment, a collision avoidance-based physical network deployment, a mobile device traffic optimization-based physical network deployment, a machine-readable visual-based physical network deployment, an Open Shortest Path First (OSPF)-based physical network deployment, a route source (RSC)-based physical network deployment, a segment routing-based physical network deployment, or a Routing Protocol for Low Power and Lossy Networks (RPL)-based physical network deployment;

the processor circuit configured for causing reaching of the destination based on switching from a first to a second of the different distinct physical network deployments.

20. The one or more non-transitory tangible media of claim 15, wherein:

the different distinct physical network deployments include two or more of a geofence-based physical network deployment, a geospatial-based physical network deployment, a collision avoidance-based physical network deployment, a mobile device traffic optimization-based physical network deployment, a machine-readable visual-based physical network deployment, an Open Shortest Path First (OSPF)-based physical network deployment, a route source (RSC)-based physical network deployment, a segment routing-based physical network deployment, or a Routing Protocol for Low Power and Lossy Networks (RPL)-based physical network deployment;

the causing including switching from a first to a second of the different distinct physical network deployments.

\* \* \* \* \*